March 19, 1963
C. F. SPADEMAN
3,081,830
LOAD MEASURING DEVICE
Filed April 15, 1957
4 Sheets—Sheet 1
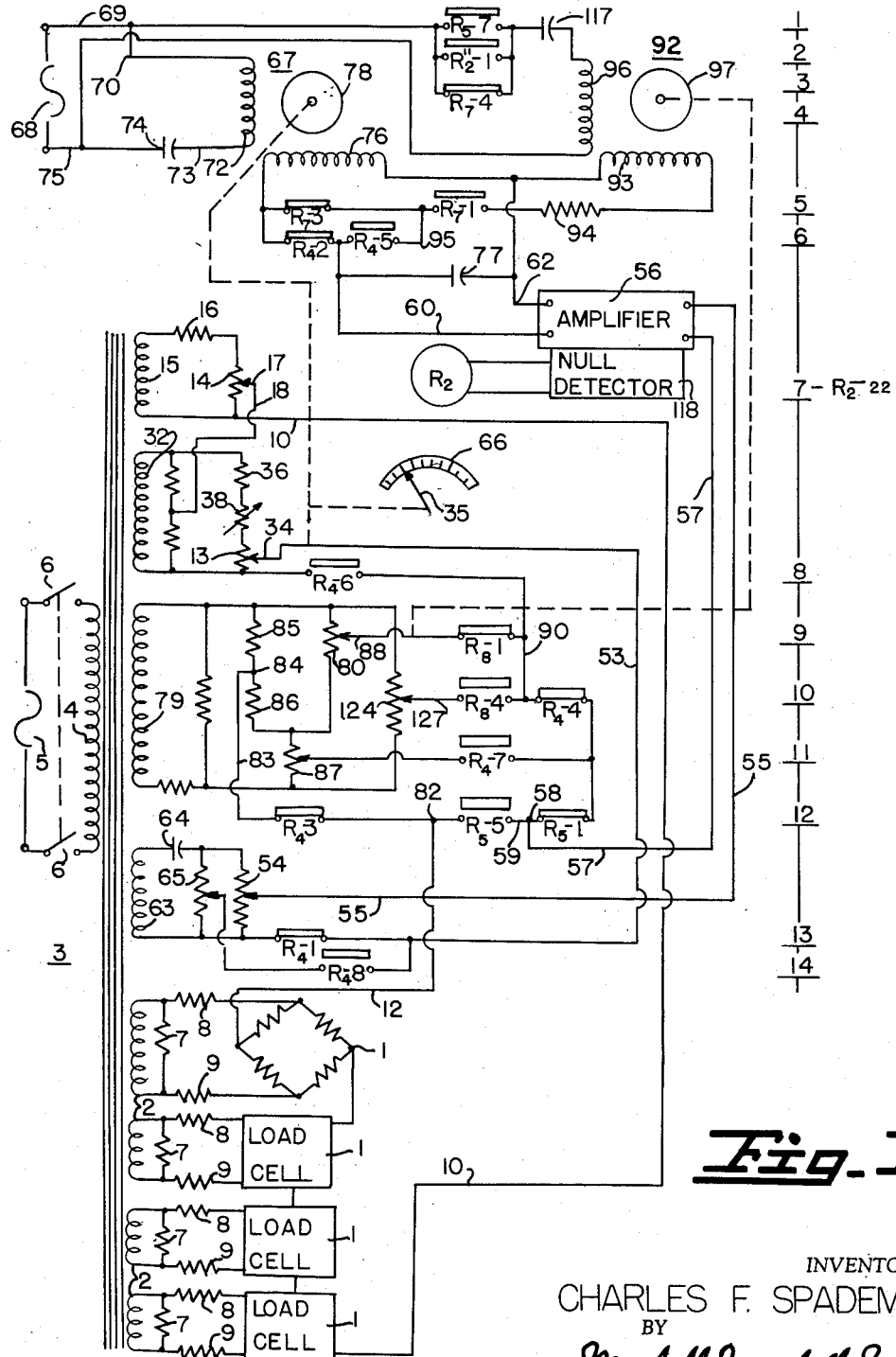
Fig. I
INVENTOR.
CHARLES F. SPADEMAN
BY
Marshall, Marshall & Gersting
ATTORNEYS March 19, 1963     C. F. SPADEMAN     3,081,830
LOAD MEASURING DEVICE
Filed April 15, 1957     4 Sheets-Sheet 2
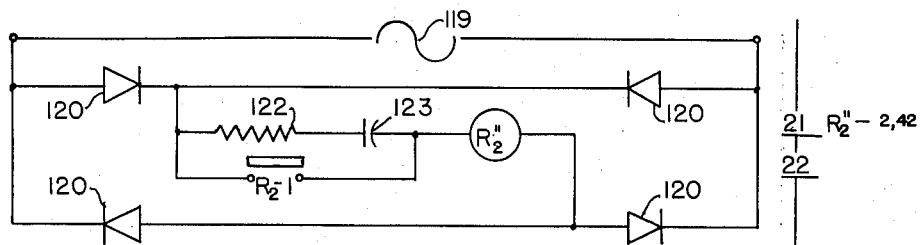
Fig. II
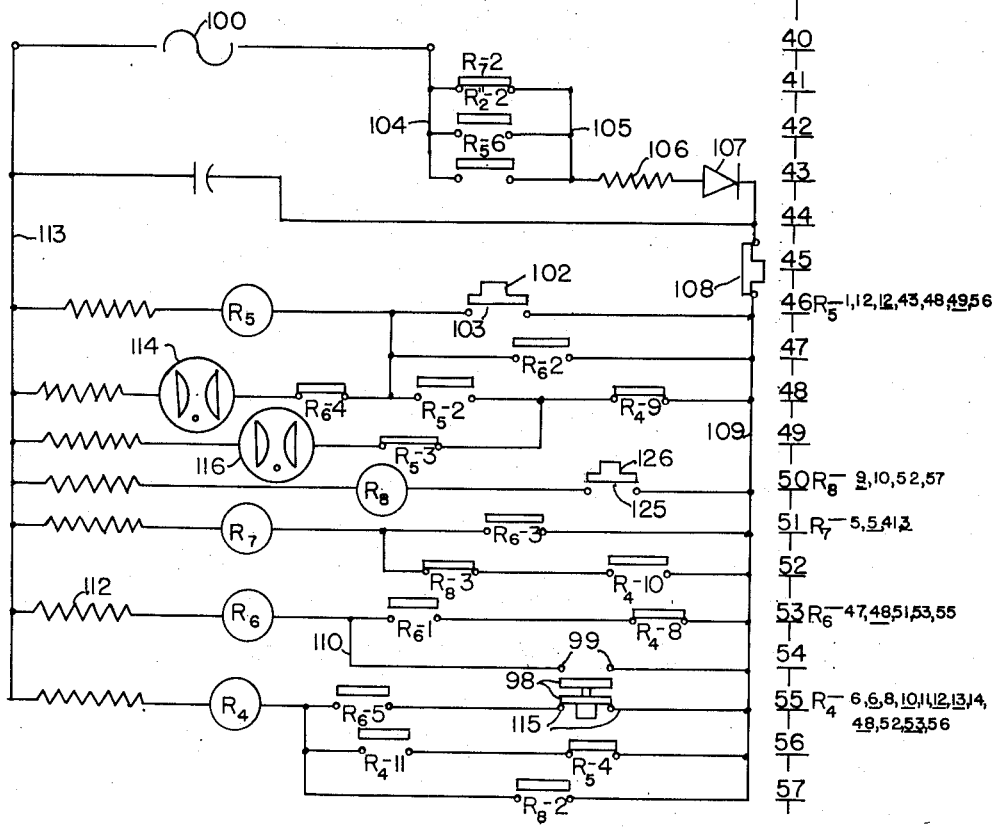
Fig. III
INVENTOR.
CHARLES F. SPADEMAN
BY
ATTORNEYS

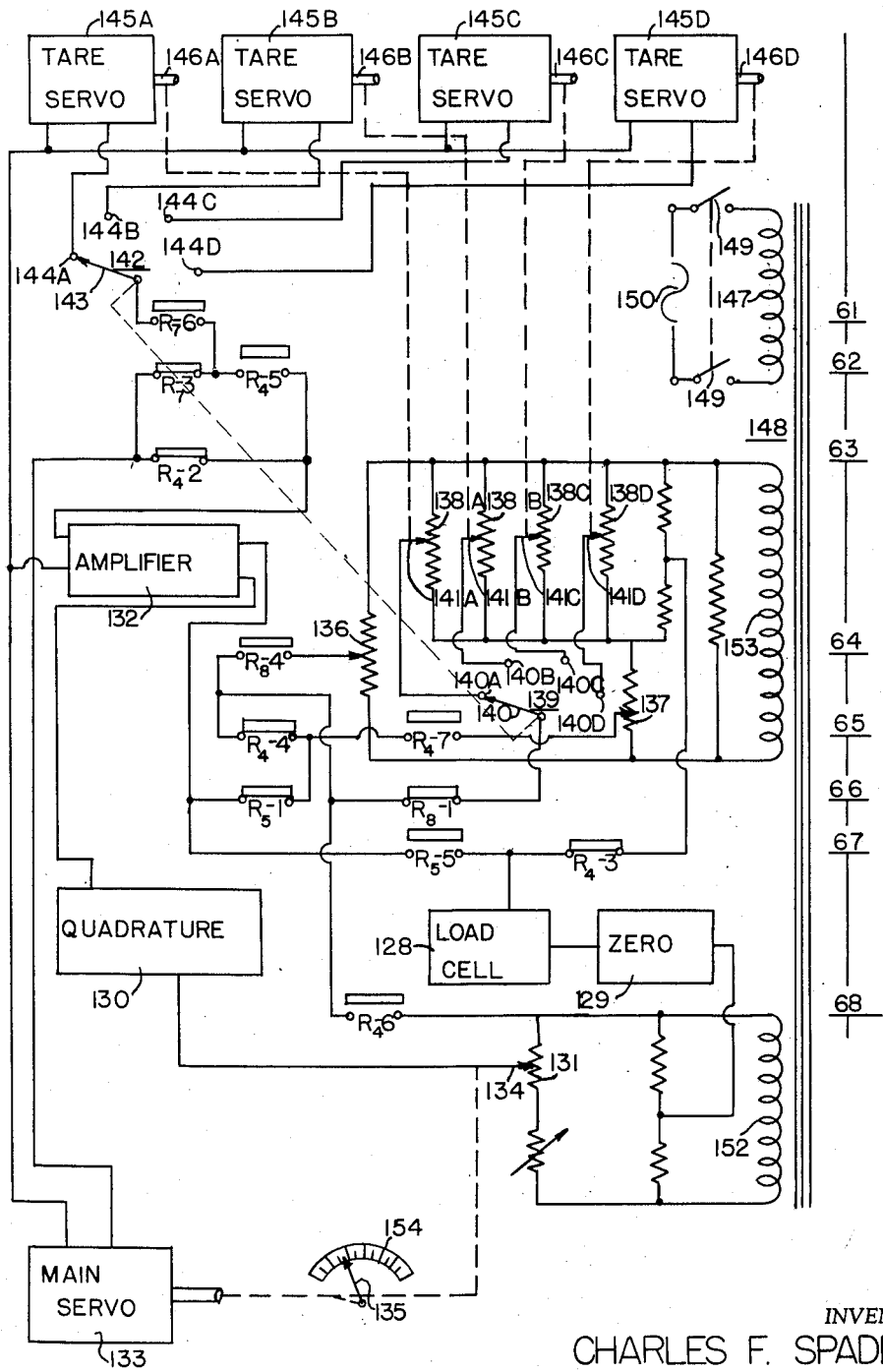
Fig. IV
INVENTOR.
CHARLES F. SPADEMAN
BY
Marshall, Marshall & Yeasting
ATTORNEYS

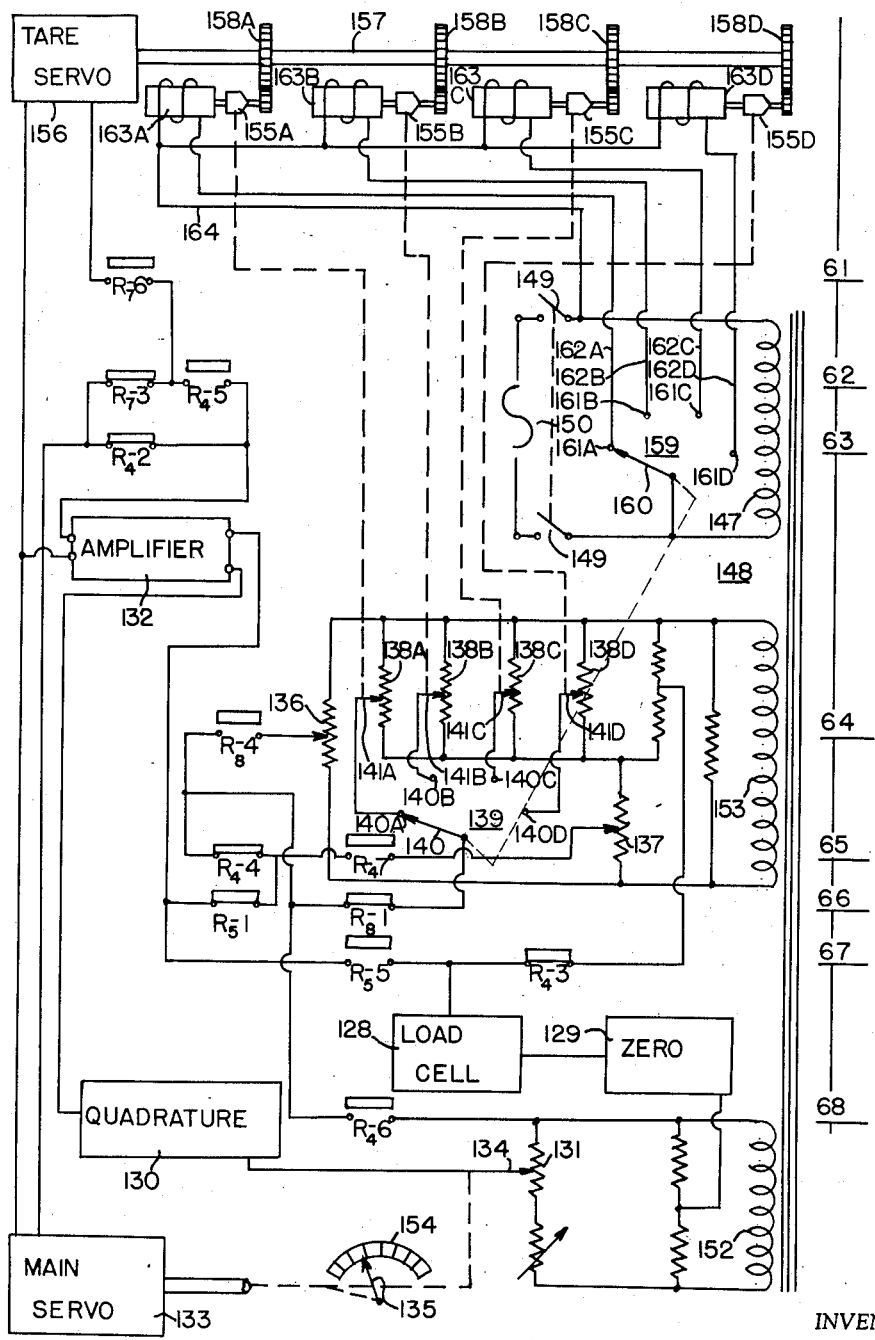

United States Patent Office 3,081,830
Patented Mar. 19, 1963

3,081,830
LOAD MEASURING DEVICE
Charles F. Spademan, Toledo, Ohio, assignor, by mesne assignments, to Toledo Scale Corporation, Toledo, Ohio, a corporation of Ohio
Filed Apr. 15, 1957, Ser. No. 652,866
14 Claims. (Cl. 177—1)

This invention relates to weighing scales and more particularly to weighing scales having means for superimposing a selected value on the indicated weight on such a scale.

Heretofore weighing scales have been provided with automatic tare devices which enable the weight of a container to be offset or deducted from a scale reading by initially weighing the container, adjusting the scale to a zero indication, and then weighing the loaded container with that adjusted zero in effect so that only the added weight is indicated. One such structure for indicating net weight is disclosed in a pendulum scale in Patent 2,746,708 for "Automatic Tare Device" which issued May 22, 1956 to L. W. Gilchrist. Another form of tare offsetting weigher is shown in W. D. Macgeorge Patent 2,610,052 for "Weighing System" which issued September 9, 1952.

The weighing systems for both of the above patents are arranged to control the filling of containers to a given weight and accordingly are confined to a narrow range of utilization wherein the adjustment of the tare level must immediately precede the operation performed to ascertain net weight. Further both require the tare weighing to be accomplished while the container is on the load receiver of the weighing system. In many applications this inflexible utilization cycle is excessively expensive in both time and equipment requirements. For example, it is desirable to employ automatic tare operations with truck scales yet these scales are often separate from the truck loading station and are required to provide both net and gross weight indications. However, in most instances the same trucks will repeatedly employ the same scale so that their tare weight need be determined once or but periodically checked and at other instances scale and truck time needn't be consumed in establishing tare weights. When the scale is utilized at a high rate, it is undesirable to establish a tare value and then bar all further use until a net weight determination employing that tare value has been made since it may require a substantial interval for the truck to move from the weighing station to the loading station and return.

One object of the present invention is to improve the techniques and apparatus for accomplishing net weighing.

Another object is to increase the flexibility of a weighing scale which deducts tare values from a gross weight. Ancillary to this primary object, an object of the invention is to enable tare weights to be established and stored in the system while the scale is employed in other weighing functions and to utilize the stored tare at a later time.

An additional object is to enable a multiplicity of tare values to be established in a weighing system and selectively to employ those values individually when appropriate without disturbing other values stored in the system.

A further object is to integrate a manual and automatic tare deduction means in a weighing system.

A further object is to facilitate net weighing with known tare values by inserting a tare adjustment without requiring the presence of the empty container on the load receiver of the system.

In accordance with the above objects, one feature of the present invention involves means establishing a force, in the illustration an electrical signal opposing the force imposed by a load on a load receiver of a weighing system, which can be selectively introduced to oppose the load receiver forces and in the interim can be stored without barring the use of the system for other weighing operations.

A second feature utilizes means for comparing the tare compensating force with the calibrated load sensing means whereby the need of calibration of the tare translating element in the system and their correlation in characteristics with respect to the load sensing or primary indicating translator is avoided without loss of precision.

Another feature comprises means for setting the tare compensating force in a weighing system, whereby the tare adjustment can be made with respect to the calibrated elements of the system without loading the scale with the empty load container.

A fourth feature includes control means enabling a tare value to be established on the weighing system either manually or automatically.

A fifth feature resides in means storing a plurality of tare values and means selectively introducing an appropriate one of said tare values.

The above and additional objects and features of this invention will be appreciated more fully from the following detailed description when read with the accompanying drawings wherein:

FIG. I is a schematic diagram of a portion of one general weighing system including a plurality of combined electrical signal means which are significant in establishing an indication of tare weight, net weight, and gross weight;

FIG. II is a schematic diagram of a circuit for sensing a predetermined condition in the circuits of FIG. I;

FIG. III is an across the line diagram of the main control circuit for the weighing system circuits of FIGS. I and II;

FIG. IV is a schematic diagram of the circuit of FIG. I somewhat simplified by the use of block representations of certain of the elements and showing one form of multiple tare storage circuit; and FIG. V is a schematic diagram corresponding to FIG. IV and showing another form of multiple tare storage circuit.

The invention is illustrated here as applied to a weighing system employing load cell actuated resistance bridges to generate a signal characteristic of a load. These translators, sometimes termed electrical strain gages, have resistance values in the individual bridge arms which change with the strains imposed thereon incidental to the distortion due to an applied load on the supporting element of the load cell. When energized from an external source, a signal which is a function of the distortion and hence the load is issued from the cell. This signal actuates a servo circuit including a servomotor actuated potentiometer and an amplifier which drives the servomotor in accordance with the difference between the signal derived from the bridges and that from the potentiometer. The servo balances these signals by appropriately positioning the potentiometer and incidental to that positioning also actuates a weight indicator which correlates weight with the potentiometer adjustment. Systems of this nature in combination with other details which also can be incorporated herein are shown in R. O. Bradley's application Serial No. 580,324 filed April 24, 1956 for "Auxiliary Load Mechanism for Weighing Scales."

In the present invention a tare value can be established automatically and stored as the setting on a suitably energized signal translator to superimpose a signal on the net signal to the amplifier. One means of establishing this tare signal level is by loading the weighing system load receiver with an empty container and actuating controls which cause the main or indicator translator and an associated servomotor to be conditioned to respond to unbalances between the signal from the load cells and that from the main translator. When the main translator is set, the controls are deenergized to deenergize the main servomotor, to disconnect load cells from the main translator and in their stead to introduce the tare translator and its servomotor to the circuit in signal opposition to the main translator signal. The load cells are then reconnected to the main translator and the tare translator connected so that the signal resulting from the setting of the tare translator continuously opposes the signal from the load cells. The net signal from the tare translator and the load cell translators corresponds to the net weight and can be balanced by the main translator signal when adjusted appropriately by the main servomotor.

In order to avoid tying up the scale during the period between a tare weighing and a net weighing, as where the container must be removed from the load receiver to a loading station, means are provided in the control circuit to selectively remove the set tare signal translator from the weighing circuit whereby during the interim gross weights can be determined, other tare weight settings can be established on other tare signal translators selectively introduced into the circuits, or other net weights can be measured using other tare signal sources.

Where the tare weight of a container is known, as from previous weighings, the controls afford means to set the tare signal source to deduct a signal corresponding to that weight from the gross weight signal derived from the load cell actuated translators without again weighing that load. This setting is established by comparing the signal from tare weight translator with that from the calibrated main weight signal translator when its indicator is set at the known tare weight. In the illustrative embodiment, comparisons of this nature are effected by providing controls to introduce into the circuit a manually adjustable signal translator having an output in phase opposition to the signal issuing from the main translator and adjusting that manually adjustable signal translator while the servo for the main translator responds to the difference between the signals to drive the main translator to a condition wherein it issues a signal balancing that issuing from the manually adjustable signal translator. The servo in driving the main signal translator also drives a main indicator which sets forth the weight equivalent of the signal currently issued by the main translator. Thus the desired tare weight signal is established in the main translator by manually adjusting a secondary translator while the servo of the main translator follows the signal adjustments or the manually adjustable signal translator to balance its signal against those adjustments. The desired tare signal is thereby indicated on the main indicator continuously and is observed during the adjustment of the manually adjustable translator. The manually adjustable translator is then released from the system while the main translator is held at the tare value and the automatic tare translator and servomotor are substituted into the circuit. The main servo is de-energized while the automatic tare servo adjusts its translator to balance the signal from the main translator and then the automatic tare servo is de-energized and the main servo reactivated while the signals from the tare and main translators are placed in an aiding or in phase relationship. Alternatively, the manual tare setting could be effected directly on a calibrated tare translator if the expense of a precision translator and calibration could be justified or the automatic tare or main translator could be disconnected from their servomotor drives as by a clutch while one or the other of those translators were set manually, utilizing the calibrated translator and its associated indicator as a standard. This latter alternative while eliminating one translator has been avoided in view of the inherent difficulties in constructing of a clutch which is competitive costwise and has suitable precision for this application.

The system is controlled by a circuit including a group of relays and indicator lamps shown in FIGURE III.

When all relays are deenergized, the net weight of the load applied to the load cells is measured and indicated on the main indicator. A net weight button 108 is provided to place the circuits in this condition by disconnecting the relays from the source of power when that button is depressed.

Gross weight is measured by depressing a button to close contacts 102 and 103 and to energize a relay which removes the tare signal source from the circuit including the load cells and the main potentiometer whereby the main potentiometer balances the entire signal generated in the load cells by the application of the load. When driven to such a balancing condition, the indicator associated with the main potentiometer indicates the gross weight applied.

A tare signal is established by imposing a tare weight on the load cells and closing push button actuated contact 98 on contact 99 so that the load cell signal is coupled as in a gross weight measurement to the main potentiometer. The main potentiometer is then driven by its servo to a condition issuing a signal balancing the signal from the load cells. When the balance is achieved, the push button is released to close contact 98 on contacts 115 and thereby deenergize the main servo so that the main potentiometer signal remains at the tare level and a self-balancing tare servo and potentiometer is connected with its signal opposing the main signal. When the tare potentiometer signal is balanced against the tare signal from the main potentiometer its servo is deenergized and the system reverts to the net weight measuring condition.

A tare signal is established by manual adjustment without imposing a load on the load cells by closing a push button 126 on contacts 125 and maintaining it closed while a manually adjustable potentiometer connected so that the signal it issues opposes the signal from the main potentiometer is adjusted. The main servo in balancing the main potentiometer signal against the manually adjustable potentiometer signal can be controlled to drive the main indicator to a position setting forth the desired tare weight. That manually adjustable potentiometer, potentiometer 80 in FIGURE I, is adjusted as by a knob and the main servo drives the main potentiometer to follow the adjustments. Thus indirectly the main potentiometer is manually adjusted, the level of such adjustment being set forth in terms of weight on the indicator so that the indicator reads the desired tare value. When so adjusted the system is returned to a net weighing condition.

A plurality of tare weight values can be retained in the circuits of FIGURES IV and V after they have been established either by a weighing operation or a manual adjustment as described above. Each tare is set into the circuit by closing a selector switch which connects an individual tare source to the circuits as outlined above. The pre-established tare signals can be utilized in a net weighing operation through the repositioning of the switches on the contacts corresponding to the selected circuits.

Additional details of the organization of the system and its several modes of operation will be described with reference to a system employing potentiometers as the manual and servomotor controlled translators and resistance bridges as the load cell actuated translators. However, it is to be understood that this description is illustrative of but one application of the invention and is not to be read as placing limitations thereon. For example, the translators actuated by the load cells might also be potentiometers, one or more of the translators might be a differential transformer or other device having a signal output which is a function of the mechanical displacement of one or more elements.

In FIG. I, the weighing system includes conventional mechanical elements (not shown) including a load receiver and suitable couplings which transmit displacement due to a load on the receiver to resistance bridges 1 which are each supplied with a suitable level of alternating current from secondaries 2 of transformer 3 when primary 4 is energized from source 5 as by closing switches 6. The current and voltage from each secondary 2 to each bridge 1 is maintained at a proper level by resistor 7 connected across the secondary, and series resistors 8 and 9. Displacement of the load receiver by application of a load alters the resistance of the bridge elements to produce a signal across the output diagonal of each bridge which is a function of the load, in accordance with well known strain gage techniques. Four translators, hereafter termed load cells, are shown connected with their outputs derived from the bridge output diagonals connected in series to provide a signal which is the sum of the individual signals.

The output signal from the load cells or weight signal translator which is significant is the net change from the unloaded to the loaded condition and, therefore, the bridges are normally adjusted to be essentially in balance whereby no signal is derived from their output diagonals when the load receiver is unloaded. Thus, the signal generated across leads 10 and 12 ideally is zero with no load on the system. A precision feedback potentiometer 13 is connected across leads 10 and 12 to impose a signal of opposite phase thereon. This potentiometer 13 constitutes the main or indicator translator in the present example. In order to insure that the signal from potentiometer 13 is adjusted to the zero or no load level, final balance of the circuit at no load is effected by a zero adjustment potentiometer 14 arranged to balance out the in phase components of the load cell signal at a level enabling the indicator feedback potentiometer signal to balance the load cell signal at its zero position. Zero adjustment potentiometer 14 is energized from secondary 15 of transformer 3 through a limiting resistor 16 so that an effective portion of the signal can be tapped off at adjustable contact 17 and transmitted by lead 18 through a span adjustment circuit and if desired, a unit weight adjustment circuit (not shown) of the type disclosed in the above noted R. O. Bradley application for "Auxiliary Load Mechanism for Weighing Scales."

Span adjustment controls the range of traverse of arm 34 on potentiometer 13 so that it is correlated with the displacement of the indicator arm 35 mechanically coupled thereto when a calibrated load is applied to the load receiver. Adjustment of span is effected by means comprising fixed resistor 36 and variable resistor 38. Span adjusting circuits are also disclosed in detail in the Bradley application. The circuit is maintained in series with the feedback potentiometer across secondary 32.

The signal resulting from the combination of the zero and span adjusting factors with the load cell and main potentiometer signals is fed from contact arm 34 through lead 53 contact $R_4$–1 of relay $R_4$ at line 13, quadrature adjustment potentiometer 54 and lead 55 to amplifier 56. The opposite terminal of the amplifier is connected to the lead 12 from the load cells through lead 57 and the tare control network. One condition for the system wherein it is set to make gross weighings and the tare circuit is effectively eliminated can be traced from junction 58, lead 59 and closed contact $R_5$–5 of relay $R_5$ at line 12, thence to junction 82 and lead 12 so that the net in phase components of the signals from the various sources in the above circuit are amplified and fed from terminals 60 and 62 to servomotors which adjust the signal translators to produce a null in the amplifier. Quadrature signals are introduced to cancel those components of the net signal which are other than in phase or 180° out of phase with the load cell signals so that amplifier 56 is not saturated by these components. Secondary 63 of transformer 3 energizes the quadrature adjustment circuit and a phase shift of the signal therefrom is introduced by capacitance 64. Potentiometers 54 and 65 enable the magnitude of the quadrature signal to be adjusted, potentiometer 54 functioning in the circuit outlined above and potentiometer 65 functioning in a circuit to be described.

Potentiometer arm 34 and indicator arm 35 cooperating with an indicia bearing scale 66 are positioned by servomotor 67 as represented by the dashed line extending from those elements to armature 78. The reference winding of this servomotor is energized from source 68 through leads 69 and 70, reference winding 72, lead 73, capacitor 74, and lead 75. Control winding 76 of the servomotor 67 is energized from amplifier 56 through leads 60 and 62 and closed back contact $R_4$–2 at line 6. Capacitor 74 shifts the line signal to the reference winding by about 90° while capacitor 77 across the control winding compensates for any phase shift which results from the inherent inductance of that winding. Thus, a net input signal to amplifier 56 having a first phase relationship to that in winding 72, as amplified across terminals 60 and 62 causes servomotor armature 78 to rotate in one direction while an input signal of the opposite phase causes it to rotate in the opposite direction. The rotation of armature 78 drives potentiometer arm 34 and indicator arm 35. Thus when arm 34 is at the zero end of the potentiometer and a load on the load receiver of the weighing system causes a signal to be generated in the load cells, that signal predominates over the other signals in the circuit and the net signal resulting therefrom is fed through amplifier 56 to cause armature 78 to rotate in a correcting direction, i.e. in a direction to advance arm 34 on potentiometer 13, to a position introducing a signal which cancels the net signal. Similarly, if the signal from the potentiometer 13 exceeds that of the load cell and the other signals, the servomotor is actuated to rotate in the opposite direction and reduce that signal until all signals balance and a null exists at the amplifier.

The remainder of the system and circuits are concerned with the control of weighing operations including tare, gross and net weighings. Since these control functions require substitutions in the circuits, a number of relay coils and contacts have been shown. In the interest of lucidity, the correlation between these actuating relay coils and their actuated relay contacts has been maintained by employing the same primary reference characters for the several elements of each relay and numbering the relay contacts in the order of their occurrence in the description by consecutive numeral suffixes separated from the primary reference character by a dash. Spatial relationships between these elements have been indicated by a marginal index on the drawings whereby the drawings in the area containing coils and contacts are divided into zones numbered 1 through 14 in FIG. I, 21 and 22 in FIG. II, 40 through 57 in FIG. III, and 61 through 68 in FIGS. IV and V. Each zone extends across the drawing in horizontal alignment with the region between its bounding index lines appearing along the right side of the drawings. The actuating coils are indexed as to location by the placement of their reference characters in a column immediately to the right of the zone identifying numbers in the index. Contacts actuated by those coils are listed by the number of their zone location in the extreme right hand column of the index. The form of the contact location numbers in the index also indicates the nature of the contact, back contacts, those which are closed when the actuating coil is deenergized and are opened when the coil is energized, having their zone numbers underlined, while front contacts, those normally opened and closed by the energization of their actuating coils are not underlined. All contacts are illustrated in the positions they assume when their actuating means are deenergized.

It will be noted that similar contact designations have been employed in FIGS. I, IV and V. The contacts thus designated have parallel functions. However in order to avoid confusion the zone index of the contacts in FIGS. IV and V has not been shown in FIG. III adjacent the actuating coils of the relays in the weighing system control circuit. It is to be appreciated that control circuits corresponding to that of FIG. III are employed with the multiple tare circuits of FIGS. IV and V.

Transformer secondary 79 energizes the circuits which function in the taring operations of the scale. In the illustrated condition the weighing system will indicate a net weight constituting the difference between the tare weight corresponding to the tare signal emanating from tare translator, potentiometer 80, and the net signal emanating from the load cells when the quadrature, span, and zero signals are appropriately adjusted. This signal is introduced as in the case of the other adjustments as a series addition between lead 12 from the load cells and lead 57 to the amplifier 56. The net weight connection is established from lead 12 through junction 82, lead 83, back contact $R_4$–3 at line 12, junction 84, voltage divider comprising resistors 85 and 86 and the resistance of potentiometer 87 together with the potentiometer 80, through its contact arm 88, back contact $R_8$–1 at line 9, lead 90, back contacts $R_4$–4 at line 10 and $R_5$–1 at line 12, and junction 58 to input lead 57 to amplifier 56. The signal developed in this tare circuit aids that in the indicator or main potentiometer circuit and opposes that from the load cells, the equipment for and method of establishing its magnitude to compensate for the signal attributable to the tare weight will now be considered.

The tare weight signal is adjusted by appropriately positioning contact arm 88 of potentiometer 80. Indicator potentiometer 13 is first activated to weigh an empty container or truck. Once the potentiometer 13 is quiescent, indicating a balance in the signals, the main servomotor 67 is de-energized and tare servomotor 92 with its potentiometer 80 is activated to balance the tare signal against the indicator signal, the load cell signal being effectively eliminated during this balancing. This matching involves utilization of a servo loop of the same nature as described above whereby the difference signal resulting from opposing the indicator potentiometer signal with the tare potentiometer signal is fed to amplifier 56 and thence through lead 62, the control winding 93 of servomotor 92, resistance 94, closed contact $R_7$–1 at line 5, lead 95, closed contact $R_4$–5 at line 6 and lead 60. The amplified control signal is so phased with respect to a reference signal in reference winding 96 of servomotor 92 that its armature 97 is rotated in a first direction when tare potentiometer signal overcompensates the indicator potentiometer signal and in the opposite direction when it is insufficient to compensate the indicator potentiometer signal. This rotation alters the position of potentiometer contact arm 88 through a coupling represented by a dashed line between those elements so that the armature and arm ultimately arrive at a rest position when the net signal reaches zero. Upon attaining the balance the tare servomotor is then de-energized and the system reverts to the net weight condition with all relays deenergized and the tare signal superimposed upon those signals issuing from the load cells, the main potentiometer, and the zero and quadrature adjustment potentiometers.

Circuits are prepared to adjust the tare signal by manual actuation of automatic tare switch contact 98 in line 55 of FIG. III to close contacts 99 at line 54. This energizes relay $R_6$ from source 100 through lead 104, back contact $R_7$–2 at line 41, lead 105, resistance 106, rectifier 107, netweight control button contact 108, lead 109, lead 110 at line 54, contacts 98 and 99, relay coil $R_6$, limiting resistor 112, and return lead 113. When relay $R_6$ pulls in it seals itself in by closing contacts $R_6$–1 at line 53 and energizes relays $R_5$ and $R_7$ by closing contacts $R_6$–2 and $R_6$–3 at lines 47 and 51 respectively to connect them across leads 113 and 109. Back contact $R_6$–4 at line 48 is opened at this time to insure that the gross weight indicator, a glow lamp 114, is extinguished. The closure of contacts $R_6$–5 at line 55 is of no effect at this time since contact 98 is separated from contacts 115 in that circuit.

Energization of relay $R_5$ closes contacts $R_5$–2 at line 48 to seal in the relay while back contacts $R_5$–3 at line 49 are opened to disable the net weight indicator, a glow lamp 116. Back contact $R_5$–4 at line 56 is opened to insure the drop out of relay $R_4$ and to function in a sequence to be described. Main scale potentiometer 13 is connected in circuit with the amplifier and load cells by closure of contacts $R_5$–5 at line 12 of FIG. I and tare potentiometer 80 is disconnected by the opening of back contacts $R_5$–1 in line 12, thereby setting the system to weigh the tare load on the main potentiometer. At the same time, relay $R_7$ is energized to prepare for the future operations of the control by altering the path to tare servomotor 92, closing contact $R_7$–1 and opening back contact $R_7$–3 in line 5 and by removing one energizing path for the control circuits by opening back contact $R_7$–2 at line 41. Relay $R_5$ thus assumes control of those circuits by closing its contact $R_5$–6 in parallel with back contacts $R_7$–2 at line 43.

While the circuit is in the state established by operating automatic tare switch 98 to set up the above conditions the weight of a load on the scale creates a net signal which actuates main scale potentiometer 13 and its servomotor 67 tending to establish a signal balance. When balance has been achieved as indicated by indicator arm 35 coming to rest, the scale operator releases the automatic tare switch 98 so that it opens the circuit at line 54 and closes the circuit at line 55 through the now closed $R_6$–5 contacts by bridging contacts 115. This energizes relay $R_4$ to disconnect the load cells 1 from the circuit feeding signals to amplifier 56 and substitute tare potentiometer 89 in their stead. Substitution is effected by dropping out relay $R_6$ and relay $R_5$ to disconnect the load cells while maintaining $R_7$ whereby the tare servomotor 92 is inserted in place of the main scale servomotor 67. Closure of contacts $R_4$–6 at line 8 connects the tare potentiometer signal in phase opposition to the main scale potentiometer signal while opening of back contacts $R_4$–4 at line 10 disconnects the circuit placing these signals in series aiding relationship. Opening of back contacts $R_4$–3 at line 12 in conjunction with the opening of contacts $R_5$–5 in that line disconnect load cells 1 from the signal circuit feeding amplifier 56. Closure of front contacts $R_4$–7 at line 11 with the closure of back contacts $R_5$–1 at line 12 insert a tare balance signal in the circuit from potentiometer 87. Closure of contacts $R_4$–8 at line 14 with the opening of back contacts $R_4$–1 at line 13 alters the quadrature signal an appropriate amount to correct for the new circuit combination by substituting a quadrature signal whose magnitude is adjusted by means of potentiometer 65 for the corresponding signal derived from potentiometer 54. Back contacts $R_4$–2 at line 6 are opened to disconnect the control winding of main servomotor 67 while front contacts $R_4$–5 at line 6 connect control winding 93 of tare servomotor through closed contact $R_7$–1 at line 5 to amplifier 56.

Tare balance potentiometer 87 is inserted during this portion of the operating sequence to supply a signal corresponding to the no load signal from the bridges 1 since these bridges are disconnected. The zero adjustment of main potentiometer 13 is initially established at a point producing some signal and is compensated by the zero adjustment potentiometer 14 in cooperation with the load cell signal at no load. Removal of the load cell signal requires the substitution for the signal at no load from the load cells by the signal from tare balance potentiometer 87 if the zero position or reference is to be maintained on the main potentiometer and the indicator 66 during tare adjustments.

In FIG. III energization of relay $R_4$ deenergizes relay coil $R_6$ by opening back contacts $R_4$–8 at line 53 to permit the contacts of $R_6$ to revert to their initial position after a suitable time delay. Back contacts $R_4$–9 at line 48 are opened to maintain the energizing paths for net weight and gross weight indicators 116 and 114 and relay $R_5$ broken when back contacts R₆-2 open at line 47. Also in anticipation of the dropping out of relay R₆ contacts R₄-10 at line 52 are closed to maintain a holding circuit for relay R₇ as contacts R₆-3 of line 51 open. Contacts R₄-11 at line 56 close to provide a holding circuit for relay R₄ when contact R₆-5 at line 55 drops out.

When R₆ drops out it deenergizes relay R₅ by opening contacts R₆-2 at line 47 and deenergizes relay R₄ by opening contacts R₆-5 at line 55. However, the drop out interval for relay R₄ is of sufficient length that relay R₅, also deenergized at this time returns its contacts to the original state before those of R₄ are so returned. Thus, back contacts R₅-4 at line 56 reestablish an energizing circuit for relay R₄ through closed contacts R₄-11 to maintain that relay and the above circuit arrangements.

While conditioned as described, the tare servomotor and tare potentiometer balance against the main scale potentiometer signal by applying the difference signal through amplifier 56 to tare servomotor control winding through closed contacts R₄-5 and R₇-1 in lines 6 and 5 while contacts R₄-2 and R₇-3 in those lines are open to disconnect the control winding 76 of the main servomotor from the amplifier. As is the case with servomotor 67, reference winding 96 of servomotor 92 is continuously energized from source 68 through leads 69 and 75 and condenser 117 during use of the weighing system. The winding is energized during all instances when relay R₇ is deenergized or relays R₅ or R₂'' are energized since it is supplied through front contacts R₅-7 and R₂''-1 and back contacts R₇-4 connected in parallel at lines 1, 2 and 3 respectively. Armature 97 is rotated as a result of the difference signal to position arm 88 in a position on potentiometer 80 imposing a signal on the circuit which reduces the signal to amplifier 56 essentially to zero.

When the amplifier attains a null condition, null detector 118 deenergizes relay R₂ at line 7. Contacts R₂-1 at line 22 are thereby permitted to open deenergizing relay R₂'' which is supplied with rectified current therethrough from source 119 and the bridge of rectifiers 120. Resistance-capacitance combination 122 and 123 introduce a time delay for the drop out of relay R₂'' which is adjusted by an appropriate choice of parameters, as is well known, to insure that relay R₂'' remains energized long enough for relay R₂ to pick up if the null is only momentary as tare potentiometer 80 overshoots the balanced condition. Drop out of relay R₂'' deenergizes the tare control circuit by opening back contacts R₂''-2 at line 42 to eliminate the only remaining path between leads 104 and 105, relay R₅ being deenergized to open contacts R₅ at line 43 and relay R₇ being energized to open back contacts R₇-2 at line 41. Similarly tare servometer reference winding is deenergized by opening R₂''-1 at line 2. Thus relays R₄ and R₇ are dropped out and the circuit is set at its net condition wherein the signal now emanating from tare potentiometer 80 aids the signal from main scale potentiometer 13 in cancelling the signal from load cells 1 so that the balanced condition is established in potentiometer 13 and on weight indicating scale 66 at a value equal to the load less the preset tare level.

The tare signal level is maintained by the setting of potentiometer 80 until the above cycle is repeated for another container or truck or it is reset by other means.

In accordance with this invention a tare value can be set into the weighing system manually without applying the container or truck to the load receiver of the weighing system. If the tare value is known, means are provided to set the calibrated main scale potentiometer 13 and weight scale 66 to the tare value and then permit the tare potentiometer to be set to a corresponding value automatically as outlined above. While the tare value might be set directly on a calibrated tare potentiometer this would materially increase the cost of the system since a precision potentiometer and the calibration of that potentiometer would be required. Similarly one might modify the coupling between the main servomotor and the main scale potentiometer-weight scale combination as with a clutch and manual drive so that they might be set directly to the tare value and the tare potentiometer signal balanced against the resulting main signal, however this again increases the expense of the system initially and from the standpoint of maintenance. Further, clutches are prone to slip thereby introducing inaccuracies or errors. Accordingly the present electrical adjustment of the main potentiometer 13 offers advantages over the alternatives both in economy and reliability.

Manual adjustment of a tare value is provided by establishing a signal in potentiometer 124 adjustment of the brush 127 and balancing the signal from potentiometer 13 against that first signal. The automatically driven tare potentiometer signal is then balanced against the adjusted main potentiometer signal. With the tare control circuit relays all deenergized, closure of contacts 125 by depressing manual tare button 126 energizes relay R₈ at line 50 of FIG. III. Contacts R₈-2 in line 57 are thereby closed to energize relay R₄ and back contacts R₈-3 at line 52 are opened to bar the energization of relay R₇ when contact R₄-10 in that line is closed. While button 126 is depressed, rheostat arm 127, now connected to main potentiometer through closed contacts R₈-4 in line 10 of FIG. I, lead 90, and closed contacts R₄-6 in line 8, is adjusted by the operator. As the signal from potentiometer 124, energized from secondary 79 with the tare balance signal superimposed thereon is increased it overbalances the signal from potentiometer 13 introducing a net signal to amplifier 56 which causes servomotor 67 to reposition arm 34 to balance. The operator by observing the indicated weight on the scale 66 can thereby adjust potentiometers 124 and 15 to that weight and can set them at the tare weight signal. This is possible since relay R₄ has maintained the tare circuit and maintain potentiometer circuit innerconnected and isolated from load cells 1 by opening contacts R₄-1 at line 13, R₄-2 at line 12 and R₄-4 at line 10 and by closing contacts R₄-6 at line 8 and R₄-8 at line 14 as described above while relay R₈ has isolated the servomotor driven tare potentiometer 80 from the circuit by opening back contacts R₈-1 at line 9. Upon setting the desired tare value on the indicator manual tare button 126 is released dropping out relay R₈ to disconnect manual tare potentiometer 124 by opening contacts R₈-4 at line 10 and reconnecting automatic tare potentiometer 80 to main potentiometer by closing back contact R₈-1 at line 9. Relay R₄ remains energized, however, through its contacts R₄-11 and back contacts R₅-4 at line 56.

Since relay R₄ is energized and relay R₈ deenergized, relay R₇ becomes energized by virtue of the closure of back contacts R₈-3 and front contacts R₄-10 at line 52. The main servomotor is thus disabled as described above in the automatic tare operation by disconnecting its control winding from amplifier 56, while the automatic tare servomotor is inserted in its stead. Thus the tare servomotor sets automatic tare potentiometer signal to a level corresponding to the signal issuing from the manually set main potentiometer 13. As the null condition is reached in amplifier 56 the null detector relay R₂ drops out to initiate the sequence reestablishing the net weight condition in the system as described.

In many instances it may be desirable to store a tare weight and utilize the scale for weighings having no relationship to that stored tare.

The system shown in FIGS. I, II and III lends itself to gross weighing operations between the setting of a tare value and the net weighing utilizing that tare. The systems of FIGS. IV and V are arranged to accomplish other tare storage functions or net weighings since they are each provided with four tare setting and tare storage circuits which can each embody the features of the system of FIGS. I, II and III. Gross weight determinations can be made without disrupting a stored value in the system of FIGS. I, II and III by eliminating the tare signals from the circuit and enabling the main scale potentiometer signal to be balanced against the signal resulting from the entire load on the load receiver. Circuits are established to perform these functions by depressing gross weight button 102 to close contacts 103 and energize relay $R_5$ at line 46. This cuts out the tare signal circuit by opening back contacts $R_5$–1 at line 12 and connects lead 12 from the load cells to terminal 57 of the amplifier by closing contacts $R_5$–5 at line 12. Indication that the scale reading is a gross weight is provided by extinguishing net weight indicator lamp 116 by opening back contact $R_5$–3 at line 49 while contact $R_5$–2 at line 48 is closed to seal in relay $R_5$ and to illuminate gross weight indication lamp 114. The load applied to the load receiver thus develops a signal which when combined with the zero and quadrature adjustment signals provides a net signal in phase opposition to the signal from main scale potentiometer 13 which is characteristic of the applied load. The difference signal resulting from the combination of the net signal and the main scale signal is fed by amplifier 56 to control winding 76 of the main servomotor 67 to reposition arm 34 and balance those signals while positioning arm 35 to set forth the corresponding weight on the scale 66.

The system of FIG. IV corresponds generally to that disclosed above in that it includes a number of interconnected signal translators and servo circuits which tend to establish a balance among the several signals and simultaneously therewith to indicate the weight represented by the signal required of a main or indicator feedback potentiometer. As in the above system tare value is set in a potentiometer driven by a tare servomotor however this feature is expanded to provide four tare servomotor-potentiometer combinations and means to select and render effective individual combinations. This arrangement with the control elements of FIGS. II and III will thus permit tare, net and gross weighings to be accomplished as above and in addition enable several tare values to be established and maintained in the system, those values being set up either automatically or manually as described and being employed to perform net weighings only when selected for use.

In addition to the basic elements comprising load cell translators 128, a zero adjustment circuit 129, a quadrature adjustment circuit 130, all feeding their combined signals with that from a main potentiometer 131 to an amplifier 132 which in turn actuates a main servomotor 133 to position main potentiometer contact arm 134 and indicator arm 135 to a signal balance, the system of FIG. IV includes the switching network of FIG. I for introducing the tare circuit at appropriate instances as dictated by a control circuit corresponding to FIGS. II and III. This tare circuit includes a manually adjustable tare potentiometer 136, a manually adjustable tare balance potentiometer 137 and four servomotor actuated tare potentiometers 138A, 138B, 138C and 138D. A selector switch 139 is provided with a contact arm 140 which can engage any one of contacts 140A, 140B, 140C and 140D connected to tare potentiometer contact arms 141A, 141B, 141C and 141D respectively. A second selector switch 142 is ganged with switch 139 so that its contact arm 143 can engage any one of contacts 144A, 144B, 144C or 144D each of which is connected to one terminal of the control winding for a tare servomotor 145A, 145B, 145C or 145D respectively connected mechanically from servomotor shafts 146A, 146B, 146C and 146D to tare potentiometer contact arms 141A, 141B, 141C and 141D as represented by the dashed lines extending therebetween.

Primary 147 of transformer 148 is energized through switches 149 from source 150. Secondary 152 energizes the main potentiometer 131 while secondary 153 energizes the tare circuit. Gross weighings are performed by disconnecting the tare circuit by opening contacts $R_5$–1 at line 66 and by the direct connection of the load cells to the amplifier by closing contacts $R_5$–5 at line 67. A tare weighing is performed by positioning the selector switches 142 and 139 appropriately, for example to the A position (as shown) and by connecting the main potentiometer directly to the load cells and eliminating the tare circuit, i.e. making a gross weighing of the empty container, by closing contacts $R_5$–5 and opening contacts $R_5$–1. The tare potentiometer is then set with respect to the main potentiometer by conditioning the selected tare servomotor to actuate the selected tare potentiometer to the signal level corresponding to that from the main potentiometer by closing contacts $R_7$–6 at line 61 and opening contacts $R_7$–3 at line 62. The signal in the main potentiometer corresponding to the tare weight is compared to and balanced by the signal from the selected tare potentiometer, potentiometer 138A in the example, by introducing that potentiometer into the circuit and disconnecting load cells 128 therefrom. Contacts $R_5$–5 and contacts $R_4$–3 are opened at line 67 to disconnect the load cells. Contacts $R_5$–1 at line 66 and $R_4$–7 at line 65 are closed to introduce the tare balance potentiometer 137 while contacts $R_4$–4 are opened at line 65 to exclude manual tare potentiometer 136. Contacts $R_4$–6 at line 68 are closed to connect automatic tare potentiometer 138A in circuit with main potentiometer 131 through closed contacts $R_8$–1 at line 66. Tare servomotor 145A is actuated by the output signal from amplifier 132 by closing contacts $R_4$–5 at line 62 to close the circuit to the appropriate control winding through closed contacts $R_7$–6 at line 61 while disconnecting main servomotor 133 by opening contacts $R_4$–2 at line 63 and maintaining contacts $R_7$–3 open at line 62.

When the tare potentiometer 138A is set, its value can be employed immediately in performing a net weighing operation since upon balance being attained between the tare and main signals the system reverts automatically to the net weight condition with contacts oriented as depicted. In this condition the signal from the effective tare potentiometer opposes the load cell signal and aids that of the main potentiometer in producing the balanced state. Main potentiometer is adjusted appropriately to eliminate the net signal effective on main servomotor 133 and to position indicator arm 135 opposite the indicium on scale 154 for the net weight of the load. Alternatively the selector switches 139 and 142 can be repositioned after the tare signal from potentiometer 138A has balanced the main potentiometer to select another tare potentiometer for a new tare weighing or, if that other tare potentiometer has been set, for a net weighing employing the tare value therein.

Similarly the tare values for any of the tare potentiometers can be set manually by a procedure paralleling that described with respect to FIG. I. A tare potentiometer to be set manually is selected by means of switches 139 and 142 and the manual tare controls actuated to disconnect the load cells and connect manual tare potentiometer 136 so that its signal opposes that of main potentiometer 131. The load cells are disconnected by opening contacts $R_4$–3 at line 67. Similarly, the opening of contacts $R_8$–1 at line 66 disconnects the tare potentiometers. Closure of contacts $R_8$–4 at line 64 connect manual potentiometer 136 with its signal opposing main potentiometer 131 through closed contacts $R_4$–6 at line 68. Opening of $R_4$–4 and closing of $R_4$–7 at line 65 connects tare balance potentiometer 137 for this utilization. The net signal from amplifier 132 actuates the main servomotor 133 through closed contacts $R_4$–5 and $R_7$–3 at line 62. When the main signal has been set at the tare level the automatic tare circuit is balanced against it as in the case of automatic tare determinations and the system then reverts to its net weighing condition.

FIG. V corresponds in most respects to FIG. IV. Therefore, most of the elements of the system of FIG. V are identified in the same manner as in FIG. IV, like reference characters and line locations for contacts being employed so that the description of the system and its mode of operation applied to FIG. IV applies as well to FIG. V with the exception of certain aspects of the tare adjusting and storage means.

In FIG. V four tare potentiometers 138A, 138B, 138C and 138D are shown each having an adjustable tap or contact arm 141A, 141B, 141C or 141D respectively. A signal is derived from the individual taps by means of selector switch 139 as described above. Contact arms 141A, 141B, 141C and 141D are positioned by means of mechanical couplings extending respectively from clutches 155A, 155B, 155C and 155D as represented by the dashed lines extending therebetween. Only a single tare servomotor 156 is employed in this embodiment. When connected to the amplifier and subjected to a signal therefrom it drives a shaft 157 which is coupled to each clutch through suitable gearing 158A, 158B, 158C and 158D. The effective tare potentiometer is adjusted by engaging its clutch while the other clutches are disengaged. Selector switch 159 is ganged with switch 139, as indicated by the coupling dashed lines, whereby the introduction of a particular tare potentiometer into the signal circuit also activates the clutch for the drive for that potentiometer. Switch 159 effects this activation by completing a circuit from source 150 through contact arm 160 of the switch to one of stationary switch contacts 161A, 161B, 161C, or 161D thence through one of leads 162A, 162B, 162C or 162D, to a clutch actuating solenoid 163A, 163B, 163C or 163D and thence through line 164 to the source. While the clutch actuating solenoid for a particular tare potentiometer is energized, any movement of the armature of the tare servomotor 156 is transmitted to the contact arm 141A, 141B, 141C or 141D of that potentiometer to effect a signal balance.

The weighing system and controls set forth above are illustrative of the invention; however, it is to be appreciated that systems employing different forms of electrical and mechanical translators in one or more of the sensing, compensating, tare and indicating subcombinations are within the spirit of this invention. Since a considerable range of equivalents will occur to one skilled in the art from the above disclosures, the scope of this invention is intended to embrace such equivalents and this description is not to be read as placing limitations thereon.

Having described the invention, I claim:

1. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a third signal translator arranged to issue a range of signal levels, means to alter the signal level issued by said third translator; means for selectively connecting said third translator in phase opposition to said second translator to compare the signal issuing from said third translator with a signal issuing from said second translator representing a given load, means for selectively connecting said second and third translator in phase opposition to said first translator to weigh the difference between a load on said load receiver and a load represented by a given signal issuing from said third translator, and means responsive to the state of balance between the signals issuing from the selectively interconnected translators to indicate the matching of signal levels issuing therefrom.

2. A weighing system according to claim 1 including means responsive to a difference signal from said interconnected translators for altering the signal level from said second translator in a manner tending to eliminate the difference signal and for actuating said weight indicator as a function of said signal.

3. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a third signal translator arranged to issue a range of signal levels, means to alter the signal level issued by said third translator, means for selectively connecting said third translator in phase opposition to said second translator to compare the signal issuing from said third translator with a signal issuing from said second translator representing a given load, means for selectively connecting said second and third translator in phase opposition to said first translator, means passing the difference signal from said interconnected translators, and actuating means for said second translator and said indicator and being responsive to said difference signal including the signal from said second translator to alter the signal level from said second translator in a balancing direction.

4. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a third signal translator arranged to issue a range of signal levels, means to alter the signal level issued by said second translator means for selectively connecting said third translator in phase opposition to said second translator to compare the signal issuing from said third translator with a signal issuing from said second translator representing a given load, means for selectively connecting said second and third translator in phase opposition to said first translator, means passing the difference signal from said interconnected translators, first actuating means for said second translator and said indicator to alter the signal level from said second translator in a balancing direction, second actuating means for said third translator to alter the signal level from said third translator in a balancing direction, means selectively connecting said first actuating means and said second signal translator signal to said signal passing means, and means selectively connecting said second actuating means and said third signal translator signal to said signal passing means.

5. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a third signal translator arranged to issue a range of signal levels, means to alter the signal level issued by said second translator means for selectively connecting said third translator in phase opposition to said second translator to compare the signal issuing from said third translator with a signal issuing from said second translator representing a given load, means for selectively connecting said second and third translator in phase opposition to said first translator to weigh the difference between a load on said load receiver and a load represented by a given signal issuing from said third translator, a fourth signal translator, means for adjusting the signal level from said fourth translator to simulate a given load signal, means for selectively connecting said fourth signal translator to said second signal translator to enable said second signal translator to be adjusted to a given simulated load, means passing the difference signal from said interconnected translators, first actuating means for said second translator and said indicator to alter the signal level from said second translator in a balancing direction, second actuating means for said third translator to alter the signal level from said third translator in a balancing direction, means selectively connecting said first actuating means and said second signal translator signal to said signal passing means, and means selectively connecting said second actuating means and said third signal translator signal to said signal passing means.

6. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators, means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator to weigh the difference between a load on said load receiver and a load represented by a given signal issuing from the selectively connected one of said third translators, and means responsive to the state of balance between the signals issuing from the selectively interconnected translators to indicate the matching of signal levels issuing therefrom.

7. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator, and means responsive to a difference signal from said interconnected translators for altering the signal level from said second translator in a manner tending to eliminate the difference signal and for actuating said weight indicator as a function of said signals.

8. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator, means passing the difference signal from said interconnected translators, first actuating means for said second translator and said indicator to alter the signal level from said second translator in a direction tending to cancel the difference signal, second means selectively actuating one of said third translators to alter the signal level therefrom in a direction tending to cancel the difference signal, means selectively connecting said first actuating means and said second translator signal to said signal passing means, and means selectively connecting said second actuating means and the signal of the selectively connected one of said third translators to said signal passing means.

9. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators, means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator, a fourth signal translator, means for adjusting the signal level from said fourth translator to simulate a given load signal, means for selectively connecting said fourth signal translator to said second signal translator to enable said second signal translator to be adjusted to a given simulated load, means passing the difference signal from said interconnected translators, first actuating means for said second translator and said indicator to alter the signal level from said second translator in a direction tending to cancel the difference signal, second means selectively actuating one of said third translators to alter the signal level therefrom in a direction tending to cancel the difference signal, means selectively connecting said first actuating means and said second translator signal to said signal passing means, and means selectively connecting said second actuating means and the signal of the selectively connected one of said third translators to said signal passing means.

10. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal tranlator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators, means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator, means passing the difference signal from said interconnected translators, first actuating means for said second translator and said indicator to alter the signal level from said second translator in a direction tending to cancel the difference signal, second actuating means for said third translators to alter the signal level therefrom in a direction tending to cancel the difference signal, means selectively connecting said first actuating means and said second translator signal to said signal passing means, and means selectively connecting said second actuating means and the signal of the selectively connected one of said third translators to said signal passing means.

11. A weighing system comprising a load receiver, a first signal translator coupled to said load receiver to issue a signal which is a function of the load applied to said load receiver, a second signal translator arranged to issue a range of signal levels, means to alter the signal level issued by said second translator a weight indicator calibrated with said second translator with respect to signal levels characteristic of load induced signals of said first translator, said indicator and said second signal translator being coupled to indicate weight as a function of signal level issued from said second translator, means for connecting said second translator selectively in phase opposition to said first translator to weigh a load imposed on said load receiver, a plurality of third signal translators each arranged to issue a range of signal levels, means for selectively altering the signal level issued by any one of said third translators, means for selectively connecting any one of said third translators in phase opposition to said second translator to compare the signal issuing from said selectively connected third translator with a signal issuing from said second translator representing a given load, means for selectively connecting said second translator and any one of said third translators in phase opposition to said first translator, means passing the difference signal from said interconnected translators, first actuating means for said second translator and said indicator to alter the signal level from said second translator in a direction tending to cancel the difference signal, individual second actuating means for each of said third translators to alter the signal level therefrom in a direction tending to cancel the difference signal, means selectively connecting said first actuating means and said second translator signal to said signal passing means, and means selectively connecting said individual second actuating means for said third translator which is connected to said second translator and the signal of the selectively connected one of said third translators to said signal passing means.

12. A weighing system comprising a load receiver, a resistance type strain gage coupled to said load receiver and having an electrical resistance which is a function of the load applied to said receiver, a source of electrical energy producing a signal in said gage, a first potentiometer having a variable signal output, an amplifier having a signal input and output, a servomotor connected to said amplifier output, a weight indicator, said servomotor actuating said first potentiometer to vary the signal therefrom and said indicator in correspondance to said potentiometer signal when said first potentiometer signal is fed to said amplifier input, a second potentiometer, means developing a signal in said second potentiometer, means to adjust the signal from said second potentiometer, means connecting said second potentiometer to said first potentiometer with the respective signals in opposition to compare the signal levels, whereby the second potentiometer can be adjusted to a level corresponding to that issued by said gage in response to a given load, and means to connect said first and second potentiometers with their respective signals aiding and in opposition to the signal from said gage and to connect the net signal of said gage and first and second potentiometers to said amplifier input, whereby said first potentiometer and said indicator are adjusted by said servomotor to a level corresponding to the difference between the load sensed by said gage and a given load represented by the signal issuing from said second potentiometer.

13. A weighing system comprising a load receiver, a resistance type strain gage coupled to said load receiver and having an electrical resistance which is a function of the load applied to said receiver, a source of electrical energy producing a signal in said gage, a first potentiometer having a variable signal output, an amplifier having a signal input and output, a first servomotor connected to said amplifier output, a weight indicator, said first servomotor actuating said first potentiometer to vary the signal therefrom and said indicator in correspondance to said potentiometer signal when said first potentiometer signal is connected to said amplifier input, a second potentiometer, a second servomotor for actuating said second potentiometer to vary the signal therefrom when said second potentiometer signal is connected to said amplifier input, a third potentiometer, means developing a signal in said second and third potentiometers, means for manually adjusting the signal from said third potentiometer, means for connecting said third potentiometer signal and said first potentiometer signal to said amplifier input and said first servomotor to said amplifier output, whereby said first potentiometer signal is adjusted to correspond to the signal from said third potentiometer, means for connecting said second potentiometer signal and said first potentiometer signal to said amplifier input and said second servomotor to said amplifier output, whereby said second potentiometer signal is adjusted to correspond to the signal from said first potentiometer, and means to connect said first and second potentiometers to said strain gage with the signals of said potentiometers aiding and in opposition to the signal from said gage, the net signal of said gage and first and second potentiometers being connected to said amplifier input, and to connect said first servomotor to said amplifier output, whereby the signal from said first potentiometer and the indicator are set at values corresponding to the difference between the signals from said gage and said second potentiometer.

14. The method of weighing a net weight of a load including a predetermined weight and said net weight in a weighing system including a load receiver, means translating the load on said load receiver to a force, indicator means generating a counterbalancing force and translating said force to a weight indication, and means transmitting said force to said indicator means comprising the steps of developing a force on said system opposing the counterbalancing force of said indicator means, adjusting said developed force to a given magnitude balancing said counterbalancing force when said indicator registers the predetermined weight, imposing said developed force of given magnitude in aiding relationship with said counterbalancing force of said indicator means, and applying said predetermined weight and said net weight to the load receiver whereby the indicator registers the net weight.

References Cited in the file of this patent

UNITED STATES PATENTS

| | | |
|---|---|---|
| 2,610,052 | Macgeorge | Sept. 9, 1952 |
| 2,638,780 | Holford | May 19, 1953 |
| 2,746,708 | Gilchrist | May 22, 1956 |
| 2,766,981 | Lauler et al. | Oct. 16, 1956 |
| 2,927,784 | Lyons | Mar. 8, 1960 |